United States Patent
Shkolnikov et al.

(10) Patent No.: US 8,862,673 B2
(45) Date of Patent: Oct. 14, 2014

(54) OPTIMIZING THE DELIVERY OF EMAIL MESSAGES CONTAINING ALTERNATIVE VERSIONS OF CONTENT

(75) Inventors: Pavel Shkolnikov, Waterloo (CA); Dimitri Mostinski, Waterloo (CA)

(73) Assignee: BlackBerry Limited, Waterloo (CA)

( * ) Notice: Subject to any disclaimer, the term of this patent is extended or adjusted under 35 U.S.C. 154(b) by 996 days.

(21) Appl. No.: 12/500,132

(22) Filed: Jul. 9, 2009

(65) Prior Publication Data

US 2010/0011078 A1    Jan. 14, 2010

Related U.S. Application Data

(60) Provisional application No. 61/079,327, filed on Jul. 9, 2008.

(51) Int. Cl.
*G06F 13/00* (2006.01)
*H04L 12/58* (2006.01)
*H04L 29/08* (2006.01)

(52) U.S. Cl.
CPC .......... *H04L 67/2823* (2013.01); *H04L 12/583* (2013.01); *H04L 67/2828* (2013.01); *H04L 12/5895* (2013.01); *H04L 51/063* (2013.01); *H04L 12/5835* (2013.01); *H04L 51/066* (2013.01)
USPC ............................. 709/206; 709/232; 709/246

(58) Field of Classification Search
CPC .............. H04L 12/583; H04L 12/5835; H04L 67/2828; H04L 51/066; H04L 67/2823; H04L 51/063; H04L 12/5895
USPC ......................... 709/206, 230–236, 249, 246; 715/751–759
See application file for complete search history.

(56) References Cited

U.S. PATENT DOCUMENTS

| 5,870,563 | A  | * | 2/1999  | Roper et al. ................... 709/239 |
| 7,533,149 | B2 | * | 5/2009  | Starbuck et al. .............. 709/206 |
| 2005/0246423 | A1 | * | 11/2005 | Starbuck et al. .............. 709/206 |

FOREIGN PATENT DOCUMENTS

| EP | 1737171 | 12/2006 |
| WO | 03005276 | 1/2003 |
| WO | WO 2005117372 | 12/2005 |

OTHER PUBLICATIONS

"Enhancements to Internet Email to Support Diverse Service Environments (Lemonade)", http://www.ietf.org/html.charters/lemonade-charter.html, Apr. 2009.
"Sending HTML and Plain Text E-Mail Simultaneously", Dr. Ralph F. Wilson, E-Commerce Consultant, Web Marketing Today, Apr. 28, 2000.
Sample MIME Message, Exchange Server 2003.
"Multipurpose Internet Mail Extensions (MIME) Part Two: Media Types", Network Working Group, N. Freed, N. Borenstein, Nov. 1996.

(Continued)

*Primary Examiner* — Kenneth Coulter
(74) *Attorney, Agent, or Firm* — Ridout & Maybee Limited

(57) ABSTRACT

A method, server and system for optimizing the delivery of email messages is provided. In accordance with one embodiment, the method comprises: receiving an email message containing at least two alternative versions of content, each version being in a different format; obtaining a reduced email message from the received email message, the reduced email message containing fewer versions than the received email message; and sending the reduced email message to the mobile communication device.

19 Claims, 6 Drawing Sheets

(56) References Cited

OTHER PUBLICATIONS

"Sieve Email Filtering: MIME Part Tests, Iteration, Extraction, Replacement and Enclosure", http://tools.ietf.org/html/draft-ietf-sieve-mime-loop-04, Feb. 2008.

Moe J-F et al., "Adapting Email Functionality for Mobile Terminals", Lecture Notes in Computer Science, Springer Verlag, Berlin, DE, Nov. 23, 2004.

Search Report dated Sep. 16, 2009.

* cited by examiner

OPTIMIZING THE DELIVERY OF EMAIL MESSAGES CONTAINING ALTERNATIVE VERSIONS OF CONTENT

This application claims the benefit of and priority to U.S. provisional patent application Ser. No. 61/079,327 filed Jul. 9, 2008, the contents of which are incorporated herein by reference.

TECHNICAL FIELD

The present disclosure relates generally to communication systems and, more particularly to a method, server and system for optimizing the delivery of multipart email messages containing alternative versions of the same or similar content.

BACKGROUND

Multipurpose Internet Mail Extensions (MIME) is an Internet standard for the format of email messages. MIME allows documents and other binary data, such as images, sound, and video, to be embedded into an email message. MIME also permits alternative content or alternative versions of the same content to be included in a single email message. For example, a message may include both a version of the content in a plain text format and a version of the content in a HyperText Markup Language (HTML) format. The plain text formatted version includes raw unformatted text. In contrast, the HTML formatted version includes formatting, such as superscripts, emphasized text, bulleted lists, superscripts, and other visual and typographic prompts to enhance the readability and aesthetics of the email message.

MIME email messages with alternative versions permit a recipient's system to choose which representation to display. For example, some email readers may prefer plain text formatted emails while others will prefer HTML.

Thus, there exists a need for methods, servers and systems for optimizing the delivery of email messages containing alternative versions of content.

BRIEF DESCRIPTION OF THE DRAWINGS

Like reference numerals are used in the drawings to denote similar elements and features.

DETAILED DESCRIPTION OF EXAMPLE EMBODIMENTS

In the mobile communications environment, delivery of email messages that contain multiple format versions of content can result in inefficient use of limited resources such as transmission bandwidth and storage space on receiving mobile communications devices if multiple versions of the same content are sent to the mobile communications device. Typically, a mobile communications device or other email receiving device will be set to display, by default, one pre-selected format type with the result that the content that is not of the pre-selected format type is not typically used or viewed at the receiving device.

Accordingly, in at least some example embodiments the present disclosure describes methods, systems and devices that can in at least some circumstances improve the efficiency of delivery of email messages that contain multiple versions to mobile communications devices. In one described embodiment, a mobile email service receives information that identifies a preferred format type used by a particular mobile communications device for viewing email messages. When an email message having content in multiple formats is received by the email service for sending to that particular mobile communication device, the email service selects the content that has the same format as the preferred format type and then sends the selected content in an email message to the mobile communication device on its own without the content that is not the preferred format type. When the email message is received at the mobile communication device the device user has the option to also receive content for the email message in one or more alternative formats and if the user elects to view the content in an alternative format, a request message is sent to the email service which then selects the alternative format content and then sends the selected alternative format content to the mobile communication device.

The process and system described above allows system resources to be conserved because for a vast majority of emails the device user only views the email message in the preferred format type. At the same time, in at least some example embodiments the device user can also elect to receive and view the email message in a format other than the preferred format type.

Figure 1:
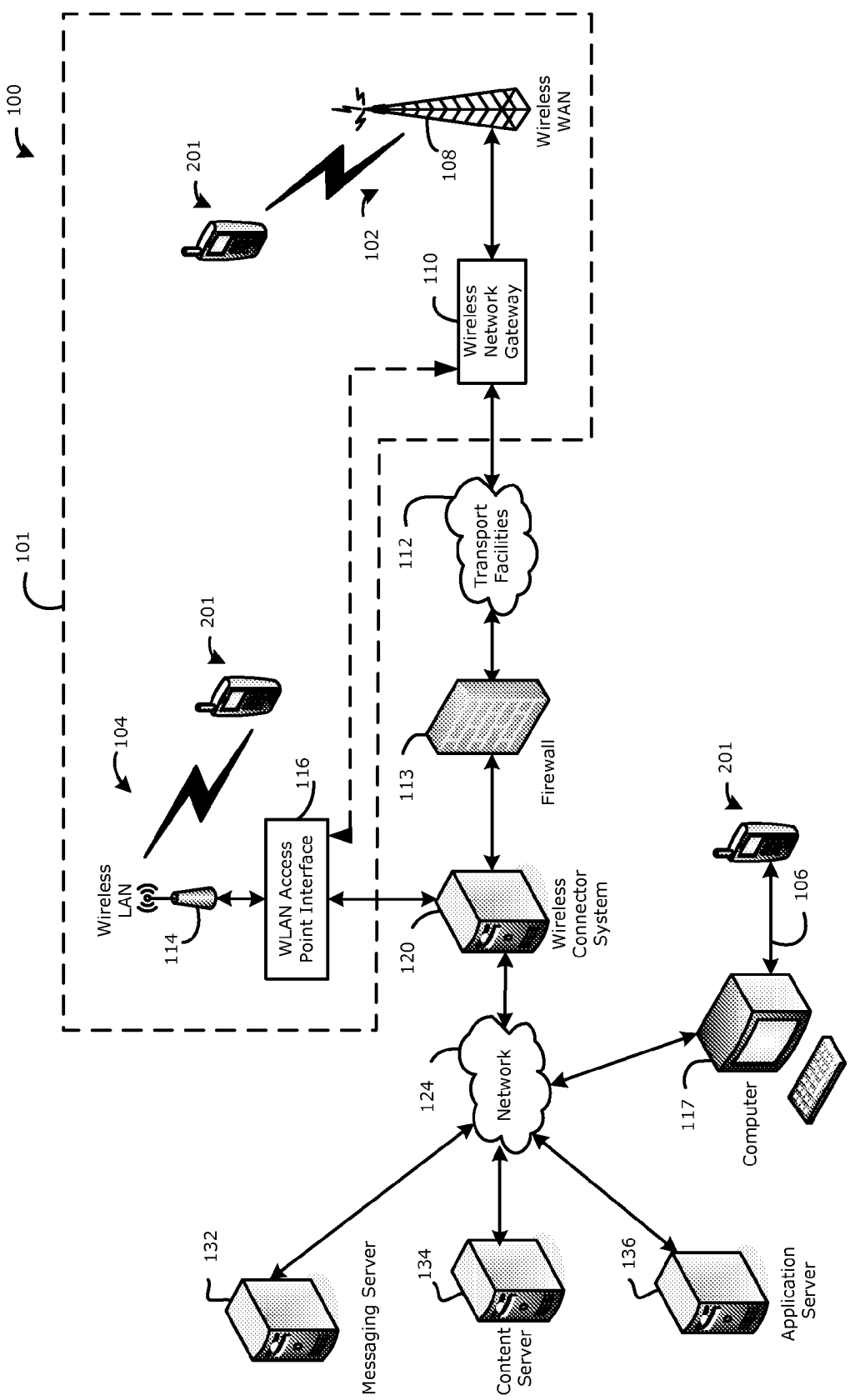
FIG. 1 is a block diagram illustrating a communication system including a mobile communication device to which system example embodiments of the present disclosure can be applied.

In order to facilitate an understanding of one possible environment in which example embodiments described herein can operate, reference is first made to FIG. 1 which shows in block diagram form a communication system 100 in which example embodiments of the present disclosure can be applied. The communication system 100 comprises a number of mobile communication devices 201 which may be connected to the remainder of the system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), WiMax (Worldwide Interoperability for Microwave Access), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the internet 112 rather than, or in addition to, an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as WI-FI) such as, for example, the IEEE 802.11a, 802.11b and/or 802.11g standards. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly, as shown by the broken line in FIG. 1, (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange, IBM Lotus Domino, or Novell GroupWise email server), a content server 134 for providing content such as internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132 or application servers 136. Conversely, the wireless connector system 120 sends data packets received, for example, from the messaging server 132 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132 and application server 136.

The network 124 may comprise a private local area network, metropolitan area network, wide area network, the public internet or combinations thereof and may include virtual networks constructed using any of these, alone, or in combination.

A mobile communications device 201 may alternatively connect to the wireless connector system 120 using a computer 117, such as desktop or notebook computer, via the network 124. A link 106 may be provided for exchanging information between the mobile communication device 201 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, FIREWIRE (also known as an IEEE 1394 interface) connection, or other serial data connection, via respective ports or interfaces of the mobile communication device 201 and computer 117. The short-range wireless communication interface may be a personal area network (PAN) interface. A Personal Area Network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. Suitable variations of the communication system will be understood to a person of skill in the art and are intended to fall within the scope of the present disclosure.

Figure 2:
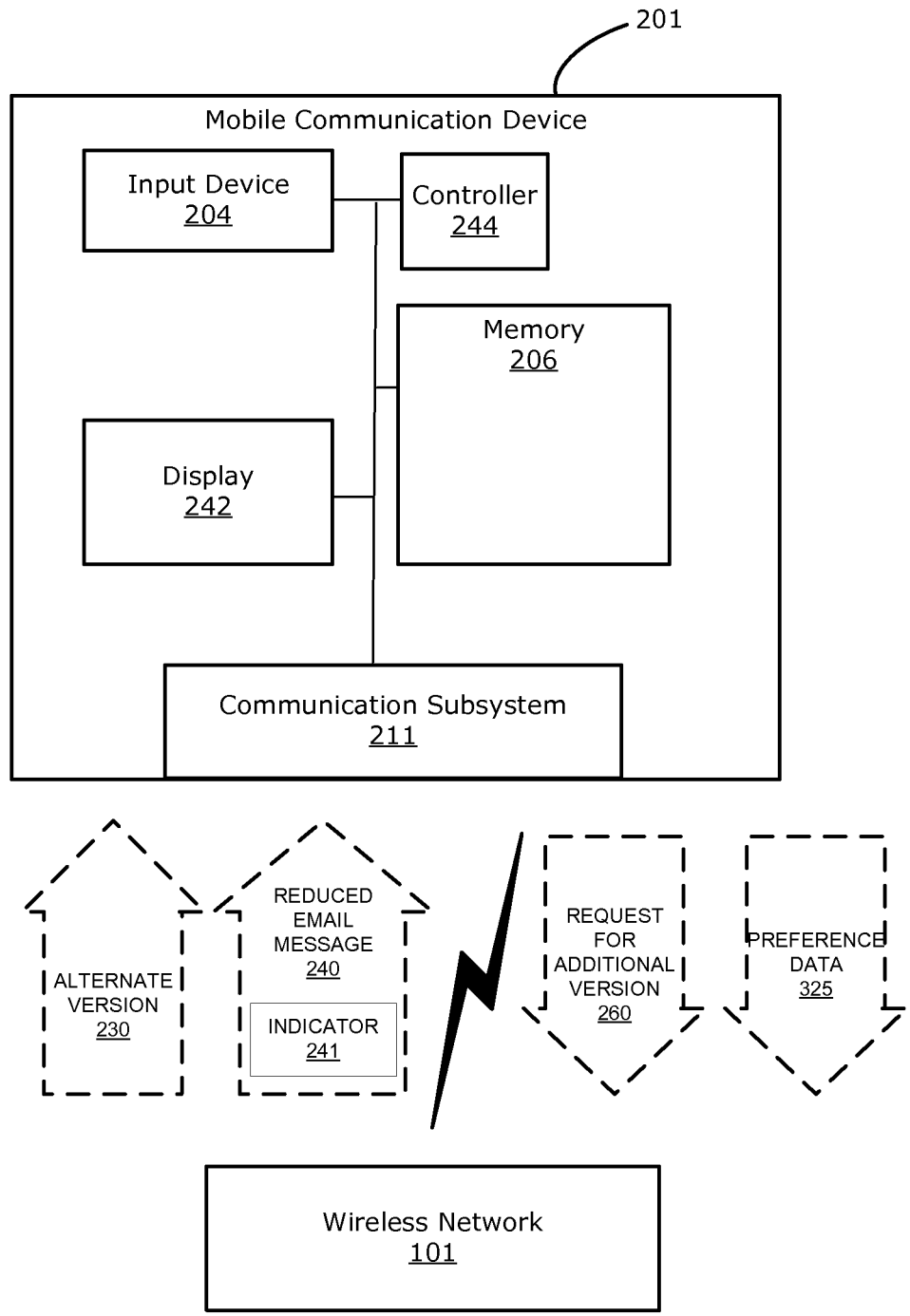
FIG. 2 is a block diagram illustrating a wireless connector system in accordance with one embodiment of the present disclosure.

Reference is now made to FIG. 2 which illustrates, in block diagram form, a mobile communication device 201 in which example embodiments described in the present disclosure can be applied. In the example embodiment, the mobile communication device 201 is a two-way communication device having at least data and possibly also voice communication capabilities, and the capability to communicate with other computer systems, for example, via the public internet. Depending on the functionality provided by the mobile communication device 201, in various embodiments the device may be, by way of example but not limitation, a data communication device, a multiple-mode communication device configured for both data and voice communication, a mobile telephone, a PDA (personal digital assistant) enabled for wireless communication, a smart phone, or a laptop computer with a wireless modem.

In some embodiments, the mobile communication device 201 is a handheld electronic device which includes a rigid case (not shown) for housing components of the device 201 and is configured to be held with one or two hands while the device 201 is in use. In some embodiments, the handheld electronic device is small enough to fit inside a purse or coat pocket or belt mounted holster.

The mobile communication device 201 includes a wireless communication subsystem 211 for exchanging radio frequency signals in the wireless network 101. The wireless communication subsystem 211 comprises at least one of a WAN communication subsystem for two-way communication with the WWAN 102 and a WLAN communication subsystem for two-way communication with the WLAN 104 via the access points 116. As will be appreciated by one skilled in the art, the wireless communication subsystem 211 includes a receiver, a transmitter, and associated components, such as one or more antenna elements, local oscillators (LOs), and a processing module such as a digital signal processor (DSP). The antenna elements may be embedded or internal to the mobile communication device 201 and a single antenna may be shared by both receiver and transmitter, as is known in the art. As will be apparent to those skilled in the field of communication, the particular design of the wireless communication subsystem 221 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed.

The mobile communication device 201 includes a controller 244 which controls the overall operation of the mobile communication device 201. The controller 244 interacts with the communication subsystem 211 which performs communication functions. The controller 244 may be implemented by way of one or more suitably programmed microprocessors.

The controller 244 also interacts with additional device subsystems which may include but are not limited to a display device 242, input devices 204 and a memory 206. The display device 242 may be, for example, a liquid crystal display (LCD) screen. The input device 204 may be, for example, a keyboard or keypad, or a navigational device such as a clickable scroll wheel (also referred to as a track wheel or thumbwheel) or trackball. The keypad may be a complete alphanumeric keypad, or may be a limited, reduced, or simplified alphanumeric keypad such as a telephone-type keypad. In some embodiments, the input device 204 and the display device 242 may be implemented using a touch screen display which includes a touch-sensitive input surface which overlays the display device 242.

The memory 206 of the mobile communication device 201 may include, for example, one or more of a random access memory (RAM) read only memory (ROM) and/or a hard disk drive (HDD), or other type of digital storage. The memory 206 may be used to store data that is local to the mobile electronic device such as email messages 364 or parts 240 of email messages. In some embodiments, the memory 206 has a location of memory reserved for storing email messages 364 such as a reduced email message 240. While the memory 206 is shown as a single block in FIG. 2, it will be appreciated that the memory 206 may include a plurality of memory devices, such as, for example ROM, RAM and/or a HDD.

The memory 206 of the mobile communication device 201 may also store other data such as service data comprising information required by the mobile communication device 201 to establish and maintain communication with the wireless network 101 (for example, network service data and gateway service data). The memory 206 of the mobile communication device 201 may also store user application data such as email messages, address book and contact information, calendar and schedule information, notepad documents, image files, or other commonly stored user information. The data stored in the memory 206 of the mobile communication device 201 may be organized, at least partially, into a number of databases each containing data items of the same data type or associated with the same application. For example, email messages, contact records, and task items may be stored in individual databases within the device memory.

The controller 244 operates under stored program control and executes software modules stored in the memory 206. The software modules comprise operating system software and software applications. Those skilled in the art will appreciate that the software modules or parts thereof may be temporarily loaded into volatile memory such as RAM of the memory 206. The RAM is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The software applications may include a range of applications, including, for example, an address book application, a messaging application, a calendar application, and/or a notepad application. In some embodiments, the software applications includes one or more of a Web browser application (i.e., for a Web-enabled mobile communication device), an email message application, a push content viewing application, a voice communication (i.e. telephony) application, a map application, and a media player application. Each of the software applications 222 may include layout information defining the placement of particular fields and graphic elements (e.g. text fields, input fields, icons, etc.) in the user interface (i.e. the display device 242) according to the application.

It will be appreciated that the mobile communication device 201 includes some additional elements which are not shown in FIG. 2 but are well known in the art. For example, the mobile communication device 201 includes a power source, which is typically one or more rechargeable batteries that may be charged, for example, through charging circuitry coupled to a battery interface. The battery provides electrical power to at least some of the electrical circuitry in the mobile communication device 201 and the battery interface provides a mechanical and electrical connection for the battery.

Figure 3:
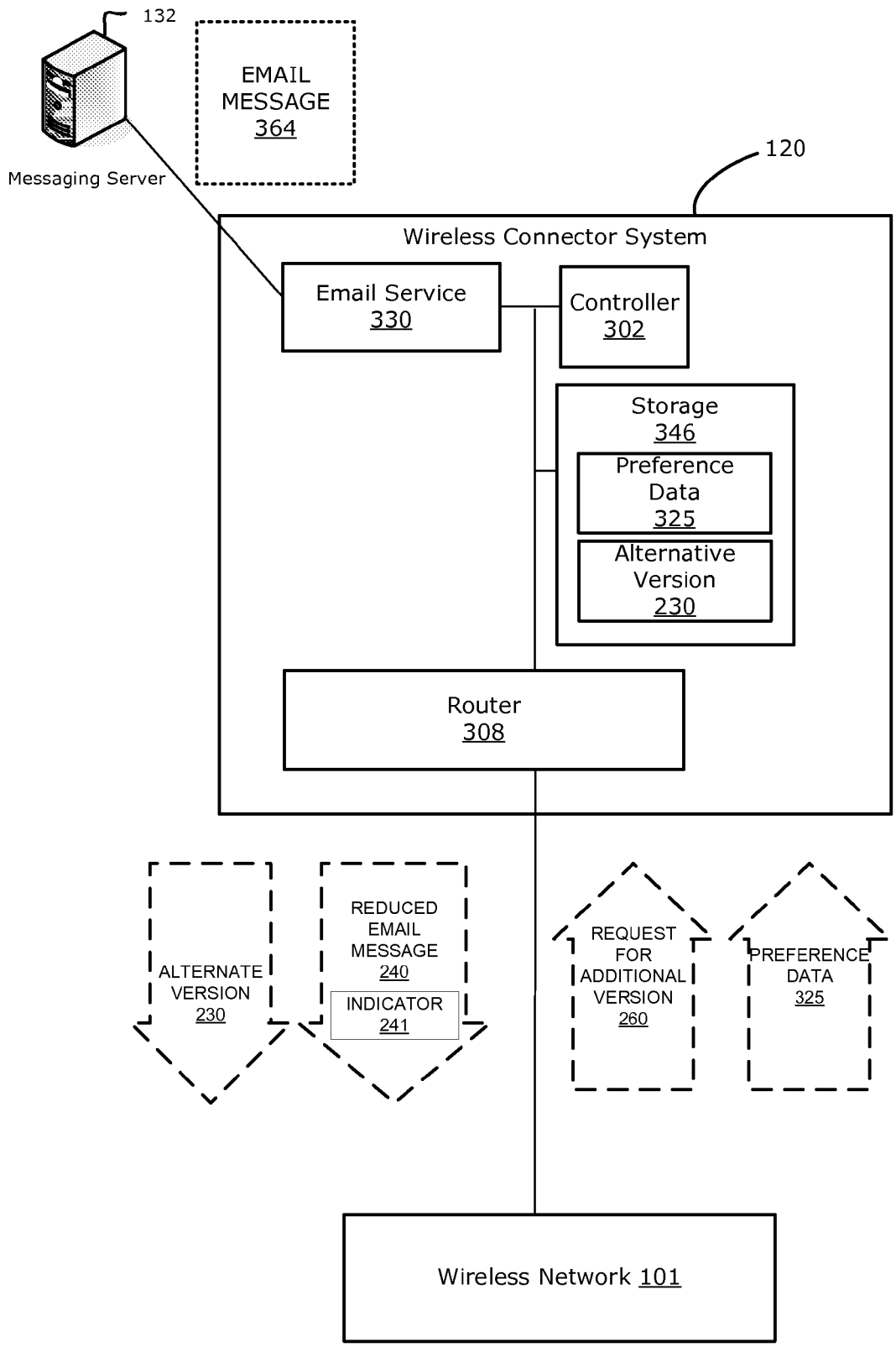
FIG. 3 is a block diagram illustrating a mobile communication device for use in accordance with one embodiment of the present disclosure.

Referring now to FIG. 3, the wireless connector system 120 for use in accordance with one embodiment of the present disclosure will now be described in more detail. The wireless connector system 120 may be implemented using any known general purpose computer technology, and may, for example, be realized as one or more microprocessor based server computers implementing one or more server applications configured for performing the processes and functions described herein. The wireless connector system 120 is configured to implement a number of components or modules, including by way of non-limiting example, a controller 302, a router 308 and an email service 330. The wireless connector system may include more of or fewer than the modules listed above. In one example embodiment, the wireless connector system 120 includes one or more microprocessors that operate under stored program control and execute software to implement these modules. The software may for example be stored in memory such as persistent memory.

The controller 302 monitors the various components or modules of the wireless connector system and restarts them if they stop working. Router 308 connects to the wireless network 101 to send data to and receive data from mobile communication devices 201. Email service 330 connects to the messaging server 132 to provide messaging services, including processing email messages 364 that are sent to mobile communication devices 201.

The controller 302, email service 330, and router 308 modules may, among other things, each be implemented through stand-alone software applications, or combined together in one or more software applications, or as part of another software application. In some embodiments, the functions performed by each of the above identified modules may be realized as a plurality of independent elements, rather than a single integrated element, and any one or more of these elements may be implemented as parts of other software applications.

Together with the other modules described above, the email service 330 configures the wireless connector system 120 to perform, at least in part, the functions of a mobile email server and in this regard the wireless connector system 120 receives email messages 364 from the messaging server 132, processes the received email messages for sending to mobile communication devices 201 in wireless network 101, and then sends the processed email messages to the recipient devices 201.

The email service 330 may be configured to execute the optimization processes described herein. The email service 330 may include instructions for execution by the controller 302 for receiving email messages containing alternative versions of content, optimizing the email messages for delivery to one or more of the mobile communication devices 201, and sending (sending) the optimized messages to the destination mobile communication device 201.

In some embodiments, the processes described herein may be applied to Multipurpose Internet Mail Extension (MIME) formatted email messages having alternative versions of content, The MIME specification is currently specified in six (6) Request for Comment (RFC) documents by the Network Working Group: RFC 2045, RFC 2046, RFC 2047, RFC 4288, RFC 4289 and RFC 2077. However, the present disclosure is not limited to any particular version and is intended to cover all prior and future versions, revisions, supplements, additions and replacements to the MIME specification to the extent they are compatible with the teachings of the present disclosure, and to cover other email formats and specifications which may contain alternative versions of content.

It will be appreciated that the alternative versions of content may be in a variety of formats. By way of example and not limitation, the alternative versions may be in plain text format, HyperText Markup Language (HTML) format, extensible Markup Language (XML) format, or Rich Text Format (RTF). In at least one embodiment, the alternative versions are of the plain text format and the HTML format. The plain text formatted versions include text with only the most basic formatting instructions, such as space and new-line characters. In contrast, the HTML formatted versions include formatting, such as superscripts, emphasized text, bulleted lists, superscripts, and other visual and typographic prompts to enhance the readability and aesthetics of the email message. To provide for such formatting, HTML emails include markup to indicate how the file should look when it is displayed or to describe the document's logical structure. Plain text formatted content generally lacks instructions to provide these features.

Traditionally, where there are alternative versions, an email reader on a recipient's system is typically configured to select one of the available formats and display the content in the available format. Accordingly, emails with alternative versions, such as MIME type emails, permit greater display options than emails without alternative versions. However, email messages with alternative versions may be costly in a wireless communication system since such emails require relatively large amounts of bandwidth to transmit and may occupy relatively large amounts of the memory 206 when they are stored on the mobile communication device 201, for example in the memory 206.

As described below, the wireless connector system 120 may remove at least one of the alternative versions from the email message 364 prior to sending the email to the recipient. Upon request, the wireless connector system 120 may transmit the alternative versions to the mobile communication device 201.

Figure 4:
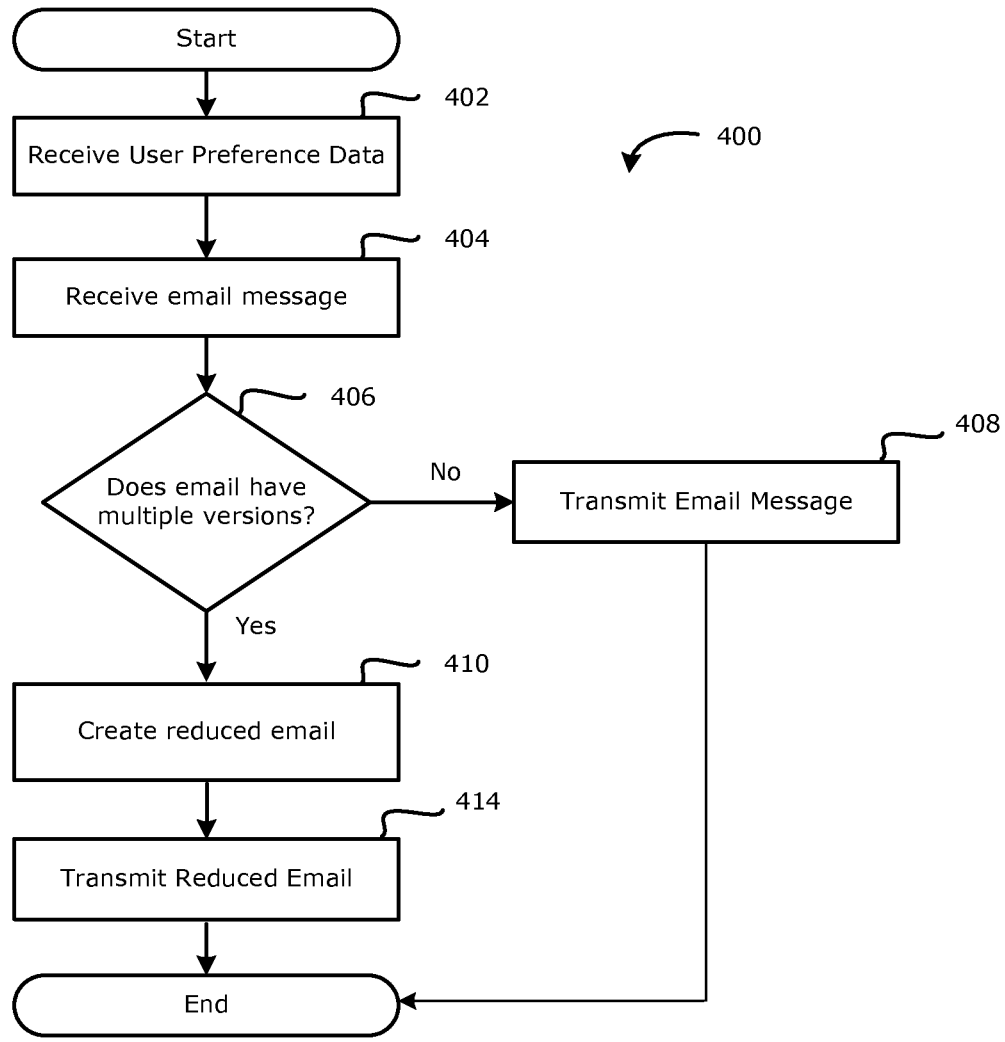
FIG. 4 is a flowchart illustrating a process for sending at least one preferred version of an email message in accordance with one embodiment of the present disclosure.

Having provided an overview, reference is now made to FIG. 4 which illustrates operations 400 for optimizing the delivery of an email message to the mobile communication device 201 in accordance with one embodiment of the present disclosure. The operations 400 may be performed by the email service 330 of the wireless connector system 120. In other embodiments, the operations 400 may be performed by a separate server connected to the wireless connector system 120.

In some embodiments, in a first step 402, preference data 325 (FIG. 3) is received by the mobile data server 120. The preference data 325 may be sent from a computer or mobile communication device 201 that is connected to the network 124 or transport facilities 112, such as the Internet. The preference data 325 describes at least one preferred format for the user of a mobile communication device 201. For example, the preference data 325 may indicate whether a user would prefer email to be displayed in the HTML format or whether the user would prefer email to be displayed in the plain text format.

The preference data 325 may be input by a user of the mobile communication device 201 using an input device 204 such as the keyboard or keypad of the mobile communication device. The preference data 325 may be transmitted to the wireless connector system 120 at various times; for example, upon activation of the mobile communication device 201. In some embodiments, the preference data 325 is transmitted to the wireless connector system 120 when the preference data 325 is updated or modified by the user.

The wireless connector system 120 receives the preference data 325 and stores it in the storage element 346 together with Device Identification Data that identifies the mobile communications device 201 that provided the preference data 325. For example, the wireless connector system 120 may store the preference data 325 in a database in the storage element 346. The database may include preference data 325 for many users or mobile communication devices 201. As will become clear in the description below, in at least some configurations such embodiments permit a user to view content in their preferred format, while reducing the bandwidth required to view such content.

Next, at step 402, an email message 364 intended for one or more mobile communication devices 201 is received by the wireless connector system 120. The email message 364 is typically received from a messaging server 132, which, in turn, may have received the email message from an email client or from another messaging server or mail transport agent, any of which may be internal or external to network 124. By way of non-limiting example, messaging server 132 may be realized using MICROSOFT EXCHANGE messaging server software on a commercially-available computer system, and the email client may be realized using Personal Information Management (PIM) application application software, such as MICROSOFT OUTLOOK email client software running on a commercially-available computer system. However, other messaging server and email client software could also be used. The email message 364 may be sent from any computer or mobile communication device 201 connected to the transport facilities 112, such as the Internet, or to the network 124.

The received email message 364 may contain multiple versions of the same (or similar) content. At step 406, a determination may be made regarding whether the email message 364 contains multiple versions. In order to determine whether the email message 364 contains multiple versions, the wireless connector system 120 may parse the contents of the email message 364.

The received email messages 364 may be MIME type email messages 364. MIME emails contain a Content-Type header which indicates the type of content in at least a portion of the email message. For example, the phrase "Content-Type: text/plain" indicates a portion of the document containing plain text content. Where content is presented in multiple versions in an email message, MIME may refer to it as alternative content. That is, the Content-Type of a multipart message having multiple versions is multipart/alternative (i.e. "Content-Type: multipart/alternative"). Accordingly, in some embodiments, the step of determining whether the email message 364 contains multiple versions may include parsing the email message 364 to determine whether it contains a section with a content type of multipart/alternative. If the wireless connector system 120 determines that there is only one version of the email message 364, the wireless connector system 120 may send the email message 364 to the mobile communication device 201 at step 408.

Where the wireless connector system 120 determines that there are multiple versions of the email message, it may proceed to a step 410 in which it creates a reduced email message 240 from the received email message 364. The reduced email message 240 is created to contain fewer versions of content than the received email message 364.

In one embodiment, the reduced email message 240 is created based on the preference data, such as the preference data 325. That is, the user preference data 325 is used to determine which format(s) are preferred. The wireless connector system 120 may create a reduced email message 240 using the preference data 325, for example, by selecting the version that is of the preferred format in the email message 364 and creating a reduced email message 240 that includes the version in the preferred format.

In some embodiments, only the most preferred format will remain in the reduced email message 240. In others, multiple versions may be included in the reduced email message 240. For example, where there are three versions in the received email message (i.e. HTML, plain text, RTF), only one version (i.e. RTF) may be removed, and the other two versions (i.e. HTML, plain text), included in the reduced email message 240. The version to be removed will be determined by the preference data 325. Accordingly, in some embodiments, the preferred format will be determined by looking up the preference data 325 in the storage element 346. Where the preference data 325 is stored in a database, the preferred format will be determined by looking up the preference data 325 in the database.

In order to create the reduced email message 240 at step 410, the wireless connector system 120 parses the received email message 364 to separate at least one version from alternative versions 230 of the same (or similar) content in a different format. For example, in a MIME type email message 364, the header "Content-Type: text/plain" indicates a portion of the document containing plain text content. Similarly, the headers "Content-Type: text/html" and "Content-Type: text/rtf" indicate portions of the email in the html format and RTF format respectively. The preferred version or versions in the email message 364 may, therefore, be separated by examining the Content-Type headers in the multipart/alternative parts of the email message 364.

At some time after the reduced email message 240 is created, it is transmitted to the intended user at step 414.

In some embodiments, the reduced email message 240 may include an indicator 241 to indicate to the mobile communication device 201 that versions have been removed from the original received email message 364 to form a reduced email message 240. That is, the indicator 241 indicates to the mobile communication device 201 or to the user of the mobile communication device 201 that at least one version has been removed and can be transmitted to the user upon request. In some embodiments, the indicator 241 may simply indicate that some versions have been removed, without describing the format of those versions. In other embodiments, the indicator 241 may indicate the format of the versions that were removed. For example, where HTML content has been removed, the indicator 241 may indicate to the user that HTML content was removed and is available for retrieval.

To permit the user to make a more informed decision about whether they wish to retrieve an alternative version, the indicator 241 may include size information indicating the size of the excluded version. The size information may describe the size of the alternative version 230 using a variety of metrics. For example, the length of the alternative version 230 in characters, the number of lines of the alternative version 230, or the overall size of the alternative version 230 in bytes. In some circumstances, the sizing information may have been included in the original received email message 364. For example, some emails may include Content-Length information for each version of content. In such circumstances, the size information may be included in the reduced email 240 by simply including the existing size information from the received email message 364 in the reduced email message 240. However, where size information is not included in the received email message 364, or where the size information in the received email message 364 is not of a desired type, the wireless connector system 120 may generate the size information and include it in the reduced email message 240.

Figure 5:
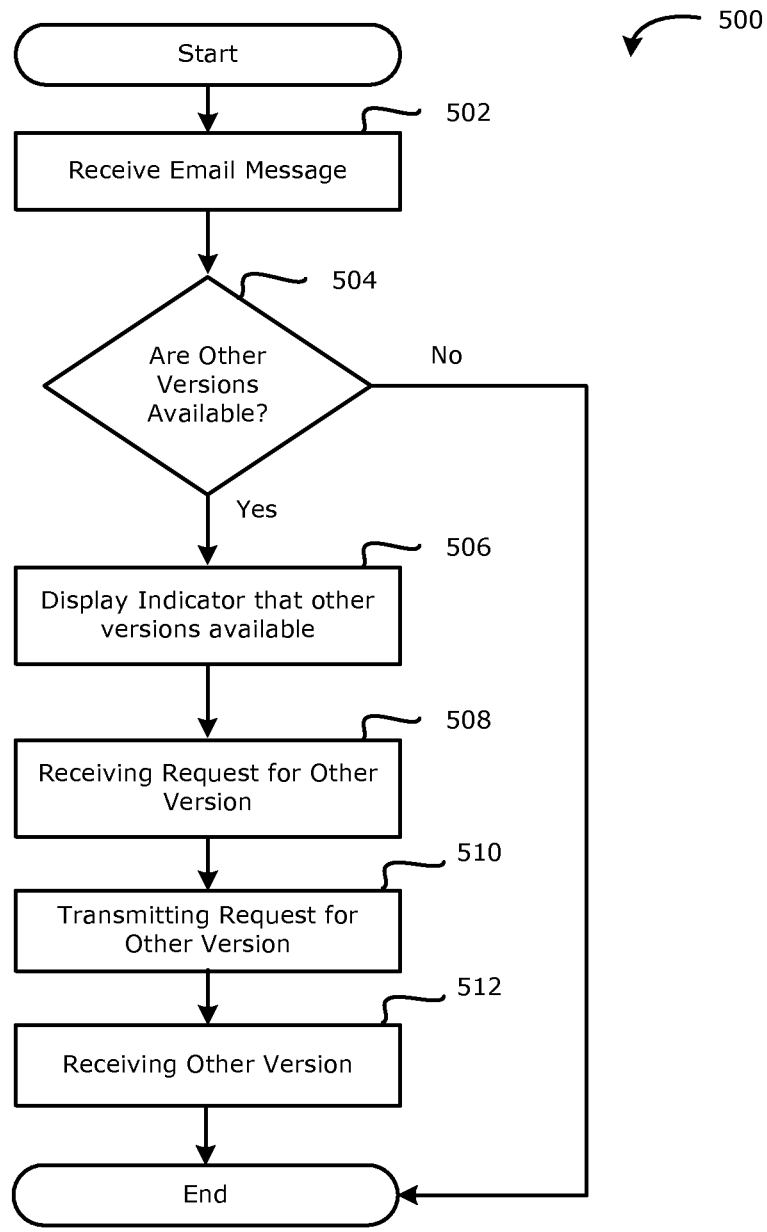
FIG. 5 is a flowchart illustrating a process for obtaining alternative versions of an email message in accordance with one embodiment of the present disclosure.

Referring now to FIG. 5, a method of obtaining at least one additional version of an email message 364 is described. The method may be executed by a mobile communication device 201. For example, the method may be executed by an appropriately configured controller such as the controller 244.

After receiving the reduced email message at step 502, a mobile communication device 201 may determine, at step 504, from the indicator 241 in the reduced email message 240, whether alternative versions 230 of the email message 364 were removed from the original message received by the wireless connector system 120. If alternative versions 230 are available, the mobile communication device 201 may display a graphical indicator on the display 242 of the mobile communication device 201 to indicate to the user that alternative versions 230 are available. The graphical indicator may take many forms including, for example, an icon, or a text based graphical indicator, such as the phrase "Alternative Versions Available." In some embodiments, the graphical indicator will not be immediately displayed, but rather, will only become visible when the user enters a predetermined input sequence using an input device, such as when the user depresses a predetermined button of the keyboard or keypad. In some embodiments, the graphical indicator may indicate which alternative versions are available (i.e. "HTML Version Available").

At step 508, the mobile communication device 201 receives a request 260 for obtaining another version of the email message 364 from the user. The request may be received via an input device such as the keyboard or keypad. Where more than one alternate version 230 is available, the request may specify which of the alternative versions is requested. Alternatively, the request may simply be a request to obtain all alternative versions 230.

At step 510, a request 260 for an alternate version 230 is transmitted to the wireless connector system 120. The request includes data indicating the identity of the message to which the request relates. For example, the request 260 may include the Message ID. Where a specific alternative version 230 is sought, the request may indicate which version of content the request relates to.

Figure 6:
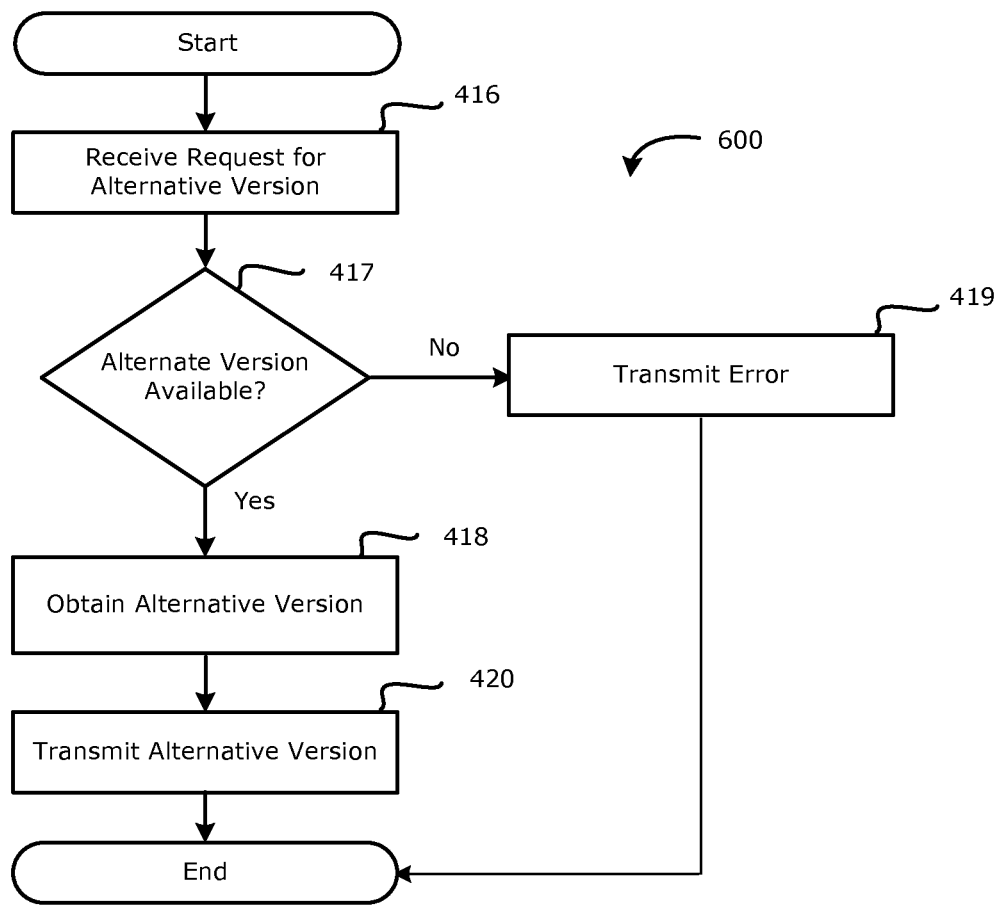
FIG. 6 is a flowchart illustrating a process for sending at least one alternative version of an email message in accordance with one embodiment of the present disclosure.

Referring now to FIG. 6, at step 416, the wireless connector system 120 receives the request 260 for an alternative version 230 of the email message 364 from the mobile communication device 201.

At step 417, the wireless connector system 120 determines whether the requested alternative version 230 is available. As will be appreciated by a person skilled in the art, at some point it may be necessary to clean up the memory which is used to store the alternative versions 230 and remove alternative versions 230 of at least some of the email messages 364. For example, in some circumstances, versions of the email that are of a certain age (i.e. 2 weeks old) will be deleted from memory of the wireless connector system 120. If a version is requested that is no longer available, at step 419, the wireless connector system 120 may return an error message to the mobile communication device 201 that the requested alternative version 230 is unavailable. The error message may be received by the mobile communication device 201 and displayed on the display 242.

If the requested version is available, at step 418 the wireless connector system 120 retrieves the requested version 230, and at step 420, sends the requested version 230 to the mobile communication device 201.

Accordingly, referring again to FIG. 5, at step 512, the mobile communication device 201 receives the appropriate alternative version 230 of the email message 364. Although not shown in FIG. 5, the communication device 201 may display the appropriate alternative version 230 of the email message 364, either as a part of step 512, or as an additional step.

It will be appreciated that the alternative versions 230 of the email message 364 may be retrieved at step 418 from a variety of locations and in a variety of formats. The processing required to retrieve the alterative versions prior to sending the requested version 230 at step 420 will vary based on the format of the stored alternative versions and the location of the storage. In one example embodiment, retrieving the alternate version includes retrieving the full version of the original email message 364 and stripping it down (for example using a method similar to that described above in respect of step 424 of FIG. 4) to obtain the alternative version 230. The full version of the original email message 364 may for example be retrieved from a sent message cache stored on local storage on the wireless connector system 120 (for example storage element 346). In other embodiments, the full version of the original email message 364 will be stored on a remote storage location, such as the messaging server 132. In the latter case, the step 416 of retrieving the alternative version 230 may include steps of requesting the original email message 364 from the messaging server 132, or other remote storage location, and receiving the original email message 364 from the remote storage location, and then processing the original email message 364 to obtain the alternative version 230.

It will also be appreciated that, in some embodiments, a stripped down version of the original email message 364 may be created and saved at local or remote storage for possible future use as the alternative version 230 when the email message is originally processed in step 410—in such cases, obtaining the alternate version in step 418 includes retrieving the stripped down version. The stripped down version of the original email does not include the versions which were included in the reduced email message 240. The stripped down version may be created at the time of creating the reduced email message 240 in step 404. In some embodiments, the stripped down version includes all versions not included in the reduced email message 240. In other embodiments, the stripped down version includes a subset of the versions not included in the reduced email message 240. The versions to be included may be determined based on the preference data 325.

Furthermore, while the preference data 325 described above was described for an embodiment in which the preference data is input by an individual user, in other embodiments, the preference data 325 is not defined by the user. In such embodiments, the preference data 325 describes the order of preference for various email message formats, but it may be defined by an entity other than the user; for example, a system administrator. In other embodiments, the preference data 325 is defined by the mobile device 201 itself, without the input of the user. For example, upon activation the mobile device 201 may transmit preference data to the wireless connector system 120. In some embodiments, the preference data 325 may be stored in, and received from, one or more of messaging server 132 and email service 330.

Additionally, while the preference data 325 was described above for an embodiment in which the preference data 325 is associated with an individual user, the preference data 325 may also be associated with other properties, such as the model type of the mobile communication device 201. For example, the preference data 325 may be defined such that all emails addressed to recipients having a mobile communication device 201 of a first model type may have a first preference (i.e. HTML is preferred to plain text), while emails addressed to recipients having a mobile communication device 201 of a second model type may have a second preference that is different than the first preference (i.e. plain text is preferred to HTML). The preferences may be related to the display capabilities of the display devices 242 on the various devices 201.

In other embodiments, a combination of the methods described above may be used to obtain the preference data 325. For example, preference data 325 may be initialized using default preferences. The default preferences may be the same for all devices or may relate to the model type of the device, or the wireless service provider used to provide data services to the mobile communication device 201. The default preferences may be overridden, however, if the user of the mobile communication device 201 enters personal user preferences. That is, the database may be initialized with default preference data 325, but the default preference data 325 may be altered if user preference data 325 is received from a mobile communication device 201.

Furthermore, in some embodiments, the step 406 described above in which the wireless connector system 120 determines whether there are multiple versions in an email message 364 may be more rigorous than simply determining whether the email message 364 contains content in more than one format. In some embodiments, the wireless connector system 120 may parse the email message 364 with greater scrutiny. For example, the wireless connector system 120 may attempt to determine whether the contents of each of the versions are sufficiently similar. If the contents differ too greatly, the wireless connector system 120 may transmit the email message 364, including all versions contained therein, to the mobile communication device 201.

In accordance with one embodiment of the present disclosure, there is provided a method for optimizing a delivery of an email message to a mobile communication device. The method comprises: receiving an email message containing at least two alternative versions of content, each version being in a different format; obtaining a reduced email message from the received email message, the reduced email message containing fewer versions than the received email message; and sending the reduced email message to the mobile communication device.

In accordance with another aspect of the present disclosure, there is provided a server for optimizing the delivery of email messages to mobile communication devices. The server comprises a controller comprising at least one processor for controlling the operation of the server. The server also includes an email service connected to the controller for receiving email messages containing at least two alternative versions of content, each version being in a different format. The email service is configured to obtain a reduced email message from the received email message. The reduced email message contains fewer versions than the received email message. The email service is further configured to send the reduced email message to the mobile communication device.

In accordance with further embodiments of the present disclosure, there are provided a computer program product comprising a computer readable medium having stored thereon computer executable instructions comprising instructions for practising the methods of the application.

While the present disclosure is primarily described as a method, a person of ordinary skill in the art will understand that the present disclosure is also directed to various apparatus such as a mobile communication device and mobile data server for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for optimizing a delivery of email messages to mobile communication devices, the method comprising:
   receiving a first email message for a first mobile communication device, the first email message containing a first version of first content and an alternative version of the first content, the alternative version of the first content being in a different format than the first version of the first content;
   selecting the first version of the first content based on preference data for the first mobile communication device;
   obtaining a reduced first email message from the first email message, the reduced first email message containing the first version of the first content and having fewer versions than the first email message;
   sending the reduced first email message to the first mobile communication device;
   receiving a second email message for a second mobile communication device, the second email message containing a first version of second content and an alternative version of the second content, the alternative version of the second content being in a different format than the first version of the second content;
   selecting the alternative version of the second content based on preference data for the second mobile communication device;
   obtaining a reduced second email message from the second email message, the reduced second email message containing the second version of the second content and having fewer versions than the second email message; and
   sending the reduced second email message to the second mobile communication device.

2. The method of claim 1, wherein the selecting the first version of the first content includes looking up, in a database, a preferred format for a user of the first mobile communication device.

3. The method of claim 2, further comprising, prior to obtaining the reduced first email message:
   receiving the preference data for the first mobile communication device from the first mobile communication device, the preference data for the first mobile communication device including the preferred format for the user of the first mobile communication device;
   storing the preferred format for the user in the database.

4. The method of claim 1, wherein the versions include a version in an HTML format and a version in a plain text format.

5. The method of claim 1, further comprising:
   saving versions of the first email message that are not included in the reduced first email message to a memory.

6. The method of claim 1, wherein the reduced first email message includes alternative version information indicating the format of versions not included in the reduced first email message.

7. The method of claim 6, further comprising, subsequent to sending the reduced first email message:
   receiving a request for a format of the first email message that was not included in the reduced first email message;
   retrieving the alternative version of the first content from the memory; and
   sending the alternative version of the first content to the first mobile communication device.

8. The method of claim 6, wherein the reduced first email message includes size information indicating the size of at least one of the versions that was not included in the reduced first email message.

9. The method of claim 1, wherein the reduced first email message includes a single version.

10. The method of claim 1, wherein the reduced first email message includes the version that is a preferred version.

11. A server for optimizing the delivery of email messages to mobile communication devices, the server comprising:
    a controller comprising at least one processor for controlling the operation of the server;
    an email service, connected to the controller, for receiving email messages containing at least two versions of content, each version being in a different format, the email service being configured to:
       for a first email message, destined for a first mobile communication device, the first email message containing a first version of first content and an alternative version of the first content, the alternative version of the first content being in a different format than the first version of the first content:
          select the first version of the first content based on preference data for the first mobile communication device;
          obtain a reduced first email message from the first email message, the reduced first email message containing the first version of the first content and having fewer versions than the first email message; and
          send the reduced first email message to the first mobile communication device;
       for a second email message, destined for a second mobile communication device, the second email message containing a first version of second content and an alternative version of the second content, the alternative version of the second content being in a different format than the first version of the second content:
          select the alternative version of the second content based on preference data for the second mobile communication device;
          obtain a reduced second email message from the second email message, the reduced second email message containing the second version of the second content and having fewer versions than the second email message; and
          send the reduced second email message to the second mobile communication device.

12. The server of claim 11, further comprising a memory, having the preference data for the first mobile communication device stored therein.

13. The server of claim 12, wherein the preference data for the first mobile communication device is stored on a database on the memory.

14. The server of claim 12, wherein the email service is configured to:
    receive the preference data for the first mobile communication device from the first mobile communication device over the wireless network, the preference data for the first mobile communication device including the preferred format for the user of the first mobile communication device; and
    store the preference data for the first mobile communication device for the user in the database.

15. The server of claim 11, wherein the versions include a version in an HTML format and a version in a plain text format.

16. The server of claim 11, further comprising a memory, and wherein the email service is configured to save the versions of the email message that are not included in the reduced first email message to a memory.

17. The server of claim 11, wherein the reduced first email message includes alternative version information indicating the format of versions not included in the reduced first email message.

18. The server of claim 17, wherein the email service is further configured to:
   receive a request for a format of the first email message that was not included in the reduced first email message;
   retrieve the alternative version of the first content from the memory; and
   transmit the alternative version of the first content to the first mobile communication device.

19. The server of claim 17, wherein the reduced first email message includes size information indicating the size of at least one of the versions that was not included in the reduced first email message.

\* \* \* \* \*